W. K. BUCKLES.
CIRCUIT CLOSER FOR ELECTRIC SIGNALING DEVICES.
APPLICATION FILED JUNE 26, 1918.
1,318,478.
Patented Oct. 14, 1919.
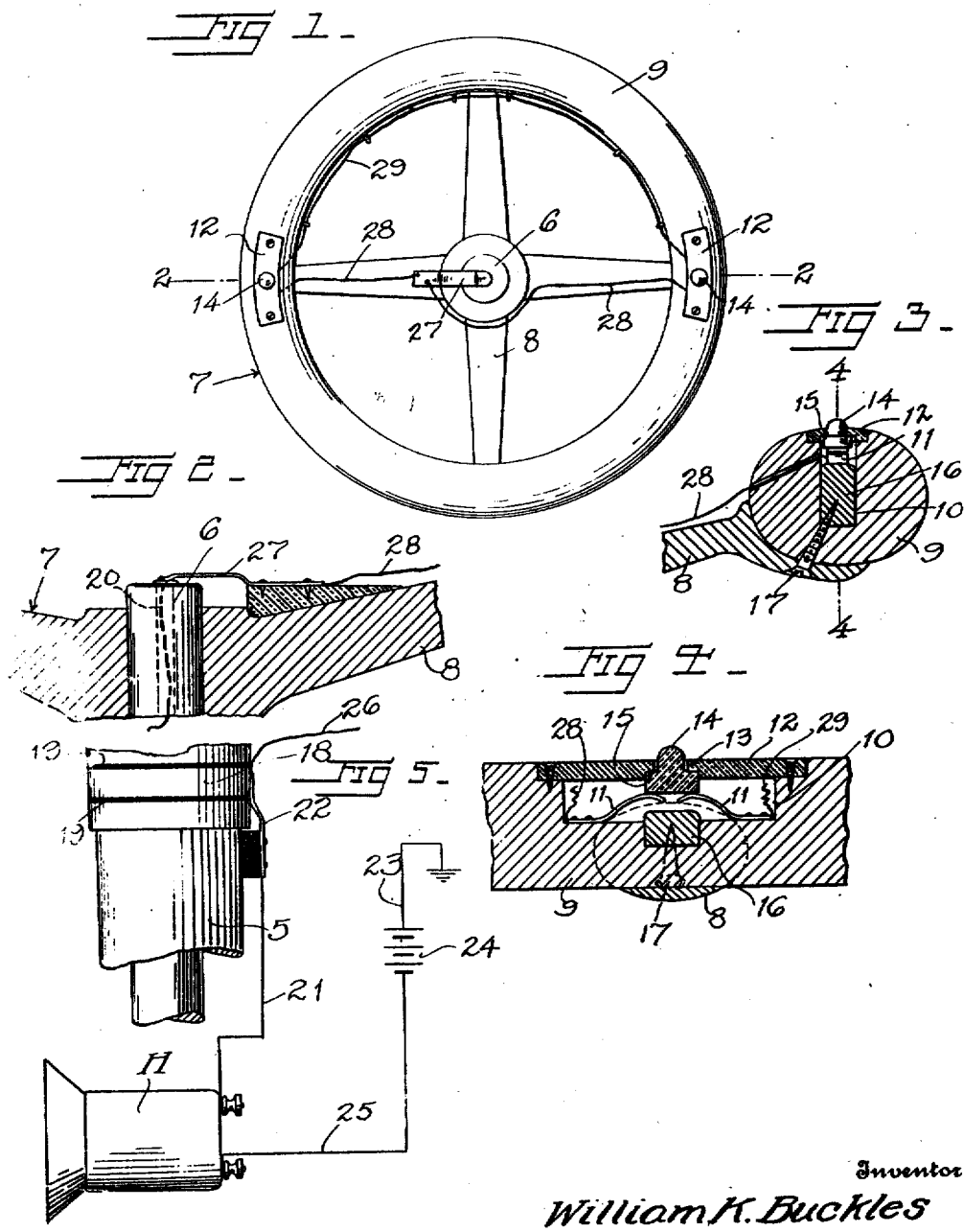
Inventor
William K. Buckles
By Watson E. Coleman
Attorney

UNITED STATES PATENT OFFICE.

WILLIAM K. BUCKLES, OF RIFLE, COLORADO.

CIRCUIT-CLOSER FOR ELECTRIC SIGNALING DEVICES.

1,318,478.   Specification of Letters Patent.   Patented Oct. 14, 1919.

Application filed June 26, 1918. Serial No. 241,989.

*To all whom it may concern:*

Be it known that I, WILLIAM K. BUCKLES, a citizen of the United States, residing at Rifle, in the county of Garfield and State of Colorado, have invented certain new and useful Improvements in Circuit-Closers for Electric Signaling Devices, of which the following is a specification, reference being had to the accompanying drawings.

This invention relates to certain improvements in circuit closers for electric signaling devices and especially adapted for use in connection with signaling devices for automobiles, and has for its primary object to provide means whereby the operator of the machine can conveniently control an electrically operable horn or analogous signaling device by the operation of a suitable switch element located at a convenient point upon the steering wheel for access by the hand of the operator without removal from the wheel.

It is also another object of my invention to provide a device for the above purpose which may be readily attached to the ordinary automobile without necessitating any material alterations therein, and which as a whole is relatively simple in its construction, and can be manufactured at comparatively small cost.

With the above and other objects in view, the invention consists in the improved construction, combination and relative arrangement of the several parts as will be hereinafter more fully described, subsequently claimed and illustrated in the accompanying drawing in which similar reference characters designate corresponding parts throughout the several views, and wherein:—

Figure 1 is a top plan view of the steering wheel of an automobile showing one embodiment of my invention applied thereto;

Fig. 2 is an enlarged sectional view taken through the central portion of the device as illustrated in Fig. 1;

Fig. 3 is an enlarged fragmentary sectional view taken through the rim portion of the device as illustrated in Fig. 1.

Fig. 4 is a horizontal section taken on the line 4—4 of Fig. 3; and

Fig. 5 is a detail elevation illustrating a slightly modified form of the device.

Referring in detail to the drawing, 5 designates the upper end of the hollow stationary post or standard such as is provided upon various types of automobiles and within which the steering rod or shaft 6 is rotatably fitted.

Upon the upper end of the shaft 6, the steering wheel 7 is keyed, splined or otherwise suitably secured, said wheel being of the ordinary construction and embodying arms 8 extending radially from a central hub and suitably fixed at their outer ends to the rim 9.

The upper portion of the wheel rim 9 at spaced points is recessed, as indicated at 10, and in the opposite ends of each recess 10, spring contact plates 11 are securely fixed to the base wall of said recess. The recess is closed by a cover plate 12, the edges of which are countersunk in the surface of the wheel rim and this plate is provided with an opening 13 to receive the push button 14 with which the free ends of the spring contact plates 11 are engaged, said plates normally urging the button 14 outwardly and engaging the shoulder 15 formed thereon with the cover plate 12. These free ends of the contact plates are opposed to a metal block 16 secured within the recess by the screw 17, whereby the wheel rim is fixed to one of the arms 8 of the wheel and the said metal block grounded to the metal arms 8.

Upon the steering wheel a resilient metal plate 27 is fixed at one of its ends, the free end of said plate having bearing engagement upon the upper end of the steering shaft 6. This contact plate 27 is electrically connected by means of a wire 28 with one pair of the contact plates 11 mounted in the wheel rim, and a wire 29 connects this pair of contact plates with the remaining contact plates 11 at the opposite side of the wheel rim. This wire 29 may be conveniently secured in any preferred manner to the inner side of the wheel rim.

Preferably, the upper end of the steering shaft is provided with a contact plate insulated from said shaft, with which the resilient contact plate 27 is engaged, and a wire 20 extends from the contact on the shaft 6 to one terminal of the operating magnet for a horn or other signaling device, indicated at H. A wire 25 leads from the other magnet terminal to one side of a battery 24, the circuit being grounded through the wire 23 connected to the other side of the battery and the frame of the machine.

In the operation of the signaling device as above described, when it is desired to operate the signal, the motorist depresses any one of the buttons 14, thus engaging the free ends of the contact plates 11 with the opposed metal block 16. A circuit will thus be closed through said block, the wire 28, spring contact 27, the wire 20, the operating magnet of the signaling device, wire 25 and battery 24 to the ground. Thus, the horn will be actuated to give the desired signal.

When the steering shaft 6 is not of hollow construction so that the wire 20 may be extended therethrough, the circuit connections are arranged as seen in Fig. 5, wherein a metal band 18 is arranged upon the hub of the steering wheel and suitably insulated therefrom, as shown at 19. One end of a wire 26 is connected to this band and the other end thereof is connected to the contact plates 11 in the wheel rim. The wire 21 extending from one terminal of the magnet of the signaling horn H, is connected to a circuit closing plate 22 mounted upon and insulated from the steering post 5, the free end of this plate having resilient, bearing contact with the metal band 18. It will thus be seen that with this arrangement, when the button 14 is depressed a circuit is closed through the plates 11, wire 26, band 18, plate 22, wire 21, the magnet of the signaling device, and battery 24 to the ground. Either arrangement of the circuit as above referred to will be effective and reliable in practical operation.

From the foregoing description, taken in connection with the accompanying drawing, the construction, manner of operation and several advantages of the device, will be clearly and fully understood. It will be seen that I have devised a very simple and serviceable signaling device for motor vehicles, which can be readily applied to the ordinary automobile steering wheel without requiring any radical alterations in the construction thereof. The several parts of the device are also of strong and durable construction and not liable to get out of order. I have herein shown two of the switch buttons mounted upon the rim of the wheel, but it will be understood that, if desired, a greater number of such buttons can be employed. It is, therefore, to be understood that while I have herein shown and described the preferred construction and arrangement of the several parts, the device is nevertheless susceptible of considerable modification therein and I, therefore, reserve the privilege of adopting all such legitimate changes as may be fairly embodied within the spirit and scope of the invention as claimed.

I claim:—

In combination, a rotatable member, an operating member secured thereto by means of screws for rotating the same, a contact carried by the rotating member, a brush engaging the contact carried by said rotatable member, and a circuit closer carried by the operating member and including two normally separated members, one of said members being in electrical connection with the brush and the second of said members being secured in position by one of said screws and in connection through said screw with a source of electrical energy.

In testimony whereof I hereunto affix my signature in the presence of two witnesses.

WILLIAM K. BUCKLES.

Witnesses:
JNO. R. WEIR,
PAUL I. GORTON.